(12) United States Patent
Campion (10) Patent No.: US 7,007,966 B2
(45) Date of Patent: Mar. 7, 2006

(54) AIR DUCTS FOR PORTABLE POWER MODULES

(75) Inventor: Edmund Campion, Encino, CA (US)

(73) Assignee: General Electric Company, Schenectady, NY (US)

( * ) Notice: Subject to any disclaimer, the term of this patent is extended or adjusted under 35 U.S.C. 154(b) by 612 days.

(21) Appl. No.: 10/001,944

(22) Filed: Oct. 23, 2001

(65) Prior Publication Data

US 2003/0030246 A1    Feb. 13, 2003

Related U.S. Application Data

(60) Provisional application No. 60/310,860, filed on Aug. 8, 2001.

(51) Int. Cl.
*B62D 53/06* (2006.01)
*H02P 9/04* (2006.01)

(52) U.S. Cl. .................. 280/423.1; 290/1 A; 123/2; 60/322; 60/694

(58) Field of Classification Search ............. 123/2; 290/1 A, 1 B; 454/83, 88, 91, 92; 60/322, 60/694; 280/423.1
See application file for complete search history.

(56) References Cited

U.S. PATENT DOCUMENTS

| | | | | |
|---|---|---|---|---|
| 3,418,485 A | * | 12/1968 | Anderson et al. | 290/1 R |
| 3,536,928 A | * | 10/1970 | Jones et al. | 290/1 B |
| 4,079,262 A | * | 3/1978 | Merkle | 290/1 B |
| 5,433,175 A | * | 7/1995 | Hughes et al. | 123/2 |
| 6,450,133 B1 | * | 9/2002 | Bernard et al. | 123/2 |

\* cited by examiner

*Primary Examiner*—Henry C. Yuen
*Assistant Examiner*—Arnold Castro
(74) *Attorney, Agent, or Firm*—Nixon & Vanderhye, P.C.

(57) ABSTRACT

Air ducts for portable power modules trailerable over public roads and capable of providing at least approximately one megawatt of electrical power. In one embodiment, the portable power module includes a shipping container having an air inlet and housing a gaseous fuel motor drivably connected to an electrical generator. In one aspect of this embodiment, the air duct includes a body positioned adjacent to the air inlet to at least partially define a first opening parallel to a first direction and a second opening at an angle to the first direction. The body of the air inlet duct further defines a first body dimension in the first direction and a second body dimension in a second direction at least substantially perpendicular to the first direction, the first body dimension being greater than the second body dimension.

33 Claims, 7 Drawing Sheets

AIR DUCTS FOR PORTABLE POWER MODULES

CROSS-REFERENCE TO RELATED APPLICATION(S)

This application claims the benefit of pending U.S. Provisional Patent Application No. 60/310,860 entitled "PORTABLE POWER MODULES AND RELATED SYSTEMS," which was filed Aug. 8, 2001, and is incorporated herein by reference. This application cross-references pending U.S. patent application Ser. No. 10/045,617 entitled "CONTAINMENT SYSTEMS FOR PORTABLE POWER MODULES," U.S. patent application Ser. No. 10/001,908 entitled "AIR PROVISION SYSTEMS FOR PORTABLE POWER MODULES," U.S. patent application Ser. No. 10/002,648 entitled "FREQUENCY SWITCHING SYSTEMS FOR PORTABLE POWER MODULES," and U.S. patent application Ser. No. 60/310,860 entitled "PORTABLE POWER MODULES AND RELATED SYSTEMS," filed concurrently herewith and incorporated herein by reference.

BACKGROUND

The described technology relates generally to air ducts for portable power modules and, more particularly, to air inlet ducts for portable power modules trailerable over public roads and capable of providing at least approximately one megawatt of electrical power.

There are many occasions when temporary electrical power may be required. Common examples include entertainment and special events at large venues. As the demand for energy quickly outstrips supply, however, temporary electrical power is being used in a number of less common applications. For example, as electrical outages occur with increasing regularity, many commercial enterprises are also turning to temporary electrical power to meet their demands during peak usage periods.

A number of prior art approaches have been developed to meet the rising demand for temporary electrical power. One such approach is a mobile system that generates electrical power using a liquid fuel motor, such as a diesel fuel motor, drivably coupled to an electrical generator. This system is capable of producing up to two megawatts of electrical power and can be housed within a standard shipping container, such as a standard 40-foot ISO (International Standard Organization) shipping container. Enclosure within a standard shipping container enables this system to be quickly deployed to remote job sites using a conventional transport vehicle, such as a typical tractor truck.

Temporary electrical power systems that use liquid fuels, such as petroleum-based fuels, however, have a number of drawbacks. One drawback is associated with the motor exhaust, which may include undesirable effluents. Another drawback is associated with the expense of procuring and storing the necessary quantities of liquid fuel. As a result of these drawbacks, attempts have been made to develop temporary electrical power systems that use gaseous fuels, such as natural gas.

Figure 1:
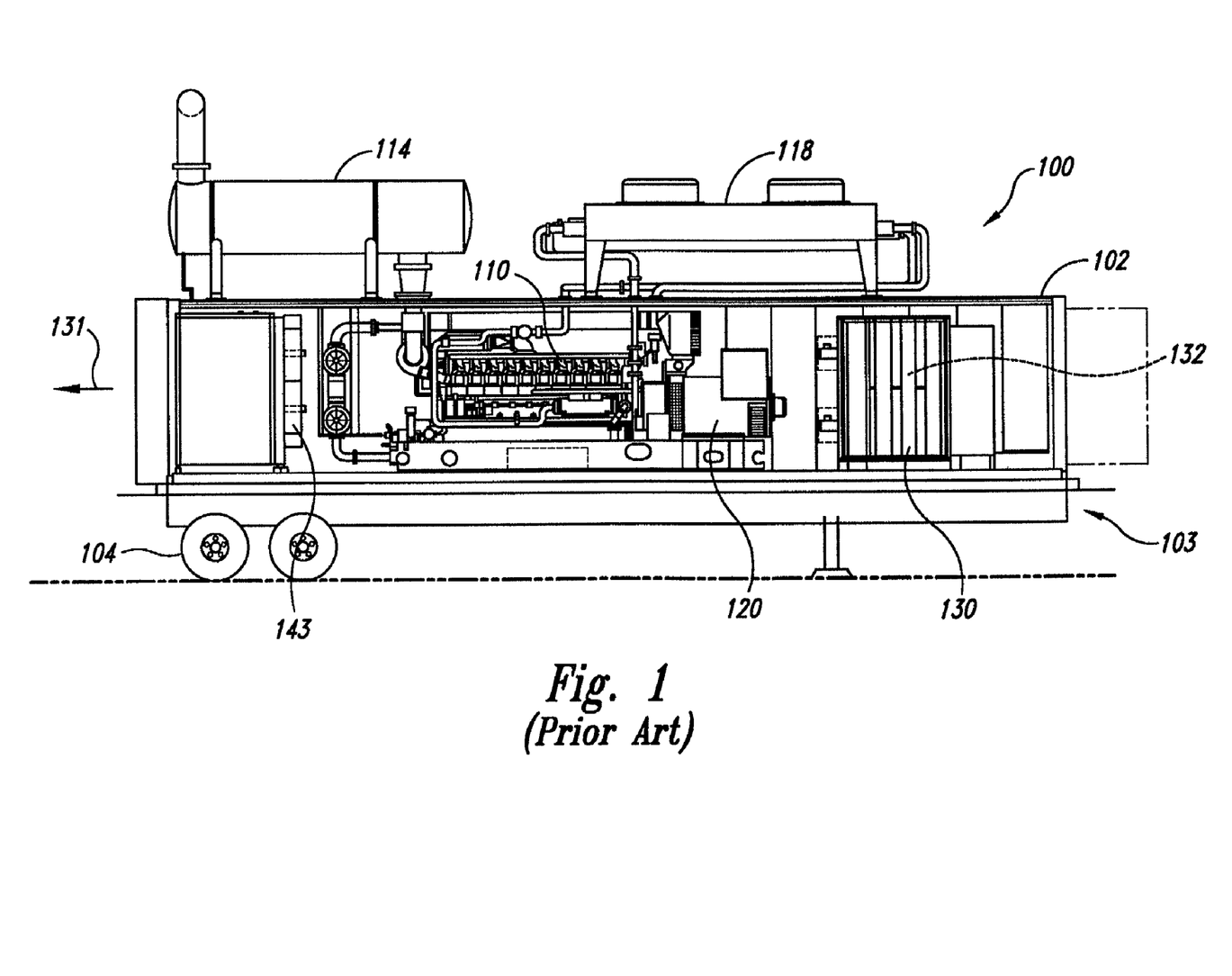
FIG. 1 illustrates an electrical power generation system in accordance with the prior art.

One such attempt at a gaseous fuel system is illustrated in FIG. 1, which shows a side elevational view of a power generation system 100 in its normal operating configuration. The power generation system 100 includes a motor 110 drivably coupled to a generator 120. The motor 110 is configured to burn a gaseous fuel, such as natural gas, and is capable of mechanically driving the generator 120 to produce an electrical power output on the order of one megawatt. The motor 110 and generator 120 are housed within a standard 40 foot ISO shipping container 102, which is supported by a trailer 103 having a tandem axle rear wheel-set 104. The trailer 103 can be coupled to a typical transport vehicle, such as a tractor truck, for movement of the container 102 between job sites.

Unlike their diesel fuel powered counterparts, gaseous fuel power generation systems of the prior art, such as that shown in FIG. 1, have an exhaust gas silencer 114 and a motor coolant radiator 118 installed on top of the container 102 during normal operation. This configuration is dictated by a number of factors, including the size of the gaseous fuel motor 110 and the amount of heat it gives off during operation. The size of the motor 110 reduces the space available inside the container 102 for the exhaust gas silencer 114 and the radiator 118, and the large amount of heat generated by the motor creates an unfavorable thermal environment inside the container for the radiator. Although the exhaust gas silencer 114 and the radiator 118 are installed on top of the container 102 during normal operation, during movement between job sites these components are removed from the top of the container to facilitate travel over public roads.

During normal operation, an air moving system 143 draws ambient air into the container 102 through a first air inlet 130 on one side of the container and a complimentary second air inlet 132 on the opposing side of the container. This ambient air is used for cooling of the motor 110 and the generator 120 and for combustion in the motor. The portion of this air used for cooling, identified as air 131, is discharged out the back of the container 102 by the air moving system 143.

A number of shortcomings are associated with the prior art power generation system 100. One shortcoming is the number of transport vehicles required to deploy the power generation system 100 to a given job site. For example, although the container 102 with the motor 110 and the generator 120 inside can be transported to the job site using only one transport vehicle, an additional transport vehicle is also required to carry the exhaust gas silencer 114 and the radiator 118. In addition, once at the job site, both the exhaust gas silencer 114 and the radiator 118 need to be installed on top of the container 102 and the necessary structural and functional interfaces connected and verified. The exhaust gas silencer 114 and the radiator 118 must then be removed from the top of the container 102 when it comes time to move the power generation system 100 to a second job site. Additional shortcomings are associated with the air inlets of the prior art power generation system 100. For example, the large quantities of ambient air pulled through the container 102 by the air moving system 143 cause high noise levels at the first and second air inlets 130 and 132. Therefore, a temporary electrical power generation system that uses gaseous fuel and has the ability to provide at least approximately one megawatt of electrical power without these shortcomings would be desirable.

DETAILED DESCRIPTION

The following disclosure provides a detailed description of air ducts for use with portable power modules. In one embodiment, the air duct is useable with a portable power module capable of providing at least approximately one megawatt of electrical power. This portable power module includes a shipping container housing a gaseous fuel motor drivably connected to an electrical generator. The air duct of this embodiment is positioned on a side of the container and introduces ambient air into the container for cooling of the motor and the generator and for combustion in the motor. In one aspect of this embodiment, the air duct has a low profile that allows an operator to move around inside the portable power module in the vicinity of the air duct. In a further aspect of this embodiment, the air duct includes acoustic attenuation features that reduce acoustic noise without appreciably reducing air flow performance.

Many specific details of certain embodiments of the invention are set forth in the following description to provide a thorough understanding of these embodiments. One skilled in the relevant art, however, will understand that the present invention may have additional embodiments, or that the invention may be practiced without several of the details described below. In other instances, structures and functions well known to those of ordinary skill in the relevant art have not been shown or described in detail here to avoid unnecessarily obscuring the description of the embodiments of the invention.

Figure 2:
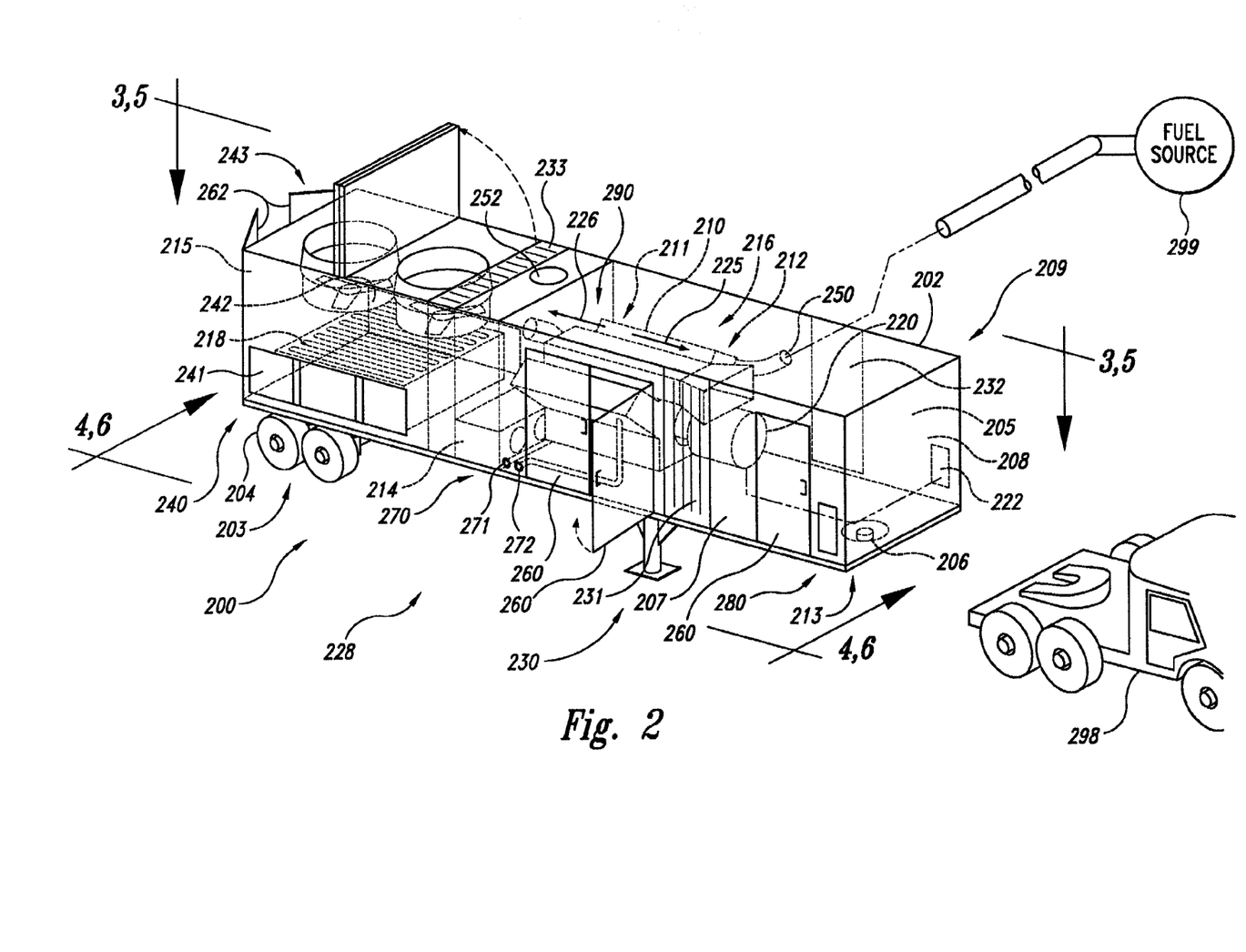
FIG. 2 is an isometric view of a portable power module in accordance with an embodiment of the invention.

FIG. 2 is an isometric view of a portable power module 200 in accordance with an embodiment of the invention. In one aspect of this embodiment, the portable power module 200 includes a container 202 defining a first interior portion, or motor compartment 205, toward a first direction 225, and a second interior portion, or radiator compartment 215, toward a second direction 226 opposite to the first direction. In the motor compartment 205, the container 202 houses a gaseous fuel motor 210 drivably connected to a generator 220 that provides electrical power to an electrical outlet 222. In the radiator compartment 215, the container 202 houses a horizontally situated radiator 218 connected in flow communication with a motor coolant jacket 212. When the motor 210 is operating, the radiator 218 receives heated coolant from the coolant jacket 212 and returns cooled coolant to the coolant jacket. A rectangular exhaust gas silencer 214 connected in flow communication with a motor exhaust gas manifold 216 receives exhaust gases from the exhaust gas manifold and vertically discharges the gases through an exhaust gas outlet 252. In a further aspect of this embodiment, the motor 210, the generator 220, the radiator 218 and exhaust gas silencer 214 are all positioned within the container 202 when the portable power module 200 is in a normal operating configuration. As used throughout this disclosure, the phrase "normal operating configuration" refers to a configuration in which the portable power module 200 can provide at least approximately one megawatt of electrical power.

The container 202 includes a first side portion 207 spaced apart from an opposing second side portion 208 and a bottom portion 213 spaced apart from an opposing top portion 209. The bottom and top portions 213 and 209 are connected to the first and second side portions 207 and 208 to at least partially define the motor compartment 205 and the radiator compartment 215. The container 202 is supported on a conventional trailer 203 having a tandem axle rear wheel-set 204 for mobility. A trailer coupling 206 is forwardly positioned on a bottom portion of the trailer 203 for releasably connecting the trailer to a suitable transport vehicle, such as a tractor truck 298, for movement of the portable power module on public roads.

In one embodiment, the container 202 has the dimensions of a standard 40-foot ISO certified steel container. As is known, standard 40-foot ISO containers such as this are a ubiquitous form of shipping container often seen on roadway, railway and maritime conveyances. The standard 40-foot ISO container has a length dimension of forty feet, a width dimension of 8 feet and a height dimension of 8.5 feet.

In one embodiment, an air provision system 228 provides necessary ambient air to the portable power module 200 during operation. The air provision system 228 includes a first air circuit 230 and a second air circuit 240. The first air circuit 230 provides ambient air to the motor compartment 205 through a first air inlet 231 positioned on the first container side 207 and an opposing second air inlet 232 positioned on the second container side 208. This ambient air serves a number of purposes, including cooling the generator 220, providing air to the motor 210 for combustion, and providing general ventilation to the motor compartment 205. As will be explained in greater detail below, a portion of the ambient air entering the motor compartment 205 through the first and second air inlets 231 and 232 exits the portable power module 200 through a first air outlet 233 positioned on the top portion 209 of the container 202.

The second air circuit 240 draws ambient air into the radiator compartment 215 through a third air inlet 241 positioned on the first container side 207 and an opposing fourth air inlet 242 positioned on the second container side 208. This ambient air passes over the radiator 218 before discharging vertically through a second air outlet 243 positioned on the top portion 209 of the container 202. Accordingly, the ambient air provided by the second air circuit 240 convects heat away from the radiator 218 to lower the temperature of coolant received from the coolant jacket 212 before returning the cooled coolant to the coolant jacket. As will be explained in greater detail below, the container 202 may be adapted to include one or more occluding members optionally positionable over the second air outlet 243 to prevent the ingress of rain or other undesirable substances.

The portable power module 200 can include various interfaces positioned on the container 202 to operatively and releasably connect the portable power module to other systems. For example, a fuel inlet 250 is provided on the second container side 208 for receiving gaseous fuel, such as natural gas, propane, or methane, from a fuel source 299 and providing the gaseous fuel to the motor 210. A heat recovery system 270 can be provided on the first container side 207 to take advantage of the heat generated by the motor 210. The heat recovery system 270 includes a heat recovery outlet 271 and a heat recovery return 272. Both the heat recovery outlet 271 and the heat recovery return 272 are connected in flow communication to the coolant jacket 212 on the motor 210. In one aspect of this embodiment, the heat recovery outlet 271 and the heat recovery return 272 are releasably connectable to a separate circulation system (not shown) for circulating the hot coolant produced by the motor 210. This hot coolant flows out through the heat recovery outlet 271 and can provide heat for various useful purposes before returning to the coolant jacket 212 through the heat recovery return 272.

The portable power module 200 of the illustrated embodiment can also include a number of doors for operator access. For example, one or more side doors 260 can be provided so that an operator can enter the motor compartment 205 to operate the portable power module 200 or to provide maintenance. Similarly, one or more end doors 262 can also be provided for operator access to the radiator 218 and related systems.

A containment system 280 is disposed adjacent to the bottom portion 213 of the container 202. In the illustrated embodiment, the containment system 280 extends substantially over the entire planform of the container 202 to prevent spillage of fluids from the portable power module 200 onto adjacent premises. For example, the containment system 280 may capture fuels or lubricants that may leak from the motor 210 over time. In addition, the containment system 280 may also capture rainwater that has entered the portable power module 200 through the second air outlet 243 or other apertures.

As those of ordinary skill in the relevant art are aware, different parts of the world use different frequencies of electrical power for their electrical equipment. For example, much of the world (e.g., Europe) uses 50 Hz electrical power, while other parts (e.g., the United States) use 60 Hz. To accommodate this difference, the portable power module 200 of the illustrated embodiment includes a frequency switching system 290 for selectively switching the frequency of the electrical power output between 50 Hz and 60 Hz. In one embodiment, the frequency switching system 290 includes a turbocharger 211 that is operatively connected to the motor 210 and has interchangeable components that allow selecting between a 50 Hz configuration or a 60 Hz configuration. The selected turbocharger configuration determines the speed, or the revolutions per minute (RPM), of the motor 210, which in turn determines the frequency of the electrical power generated by the generator 220. Accordingly, the electrical power provided by the portable power module 200 can be provided in either 50 Hz or 60 Hz form by selecting the appropriate turbocharger configuration.

The portable power unit 200 of the illustrated embodiment can use a number of different types of motors and generators. For example, in one embodiment, the portable power module 200 can use a gaseous fuel-burning reciprocating motor, such as the J 320 GS-B85/05 motor manufactured by Jenbacher AG. In another aspect of this embodiment, the generator can be an HCI 734 F2 generator manufactured by the Stamford Company. In other embodiments, other motors and other generators can be employed.

In one embodiment, the portable power module 200 can be used to provide temporary electrical power at a remote site as follows. After a customer has placed an order for temporary electrical power, the operator deploys the portable power module 200 to the designated site. Deployment includes releasably attaching the coupling 206 to the transport vehicle 298 and transporting the portable power module 200 to the site. During transport, the various doors (e.g., 260, 262) and covers (e.g., over the first air outlet 233, the second air outlet 243, and the exhaust gas outlet 252) should be closed. Upon arrival at the site, the transport vehicle 298 can be uncoupled from the portable power module 200 and can leave the site. Before operating the portable power module 200, the fuel source 299, such as a natural gas source, is connected to the fuel inlet 250, and the second air outlet 243, the exhaust gas outlet 252, and the first air outlet 233 are uncovered. In this normal operating configuration, the motor 210 can be started and the portable power module 200 can provide at least approximately one megawatt of electrical power to the electrical outlet 222 for use by the customer.

The portable power module 200 has a number of advantages over the power generation systems of the prior art, such as the prior art system shown in FIG. 1. For example, because the fully assembled, operable portable power module 200 fits entirely within a standard 40-foot ISO shipping container, it complies with applicable U.S. Department of Transportation (DOT) standards for travel over public roads. Further, in the embodiment illustrated in FIG. 2, the gross weight of the container 202 including its internal components does not exceed 53,000 pounds, and the portion of that 53,000 pounds that is positioned over the tandem rear axle wheel-set 204 does not exceed 34,000 pounds. As a result, the gross vehicle weight of the portable power module 200 combined with the transport vehicle (not shown) will usually not exceed 80,000 pounds, thereby complying with applicable DOT weight standards for travel over public roads. Because of these advantages, the portable power module 200 can be easily deployed to a remote job site over public roads using only a single transport vehicle. In addition, because the major systems associated with the portable power module 200 (e.g., motor 210, generator 220, radiator 218, exhaust gas silencer 214, etc.) are installed within the container 202 in their normal operating configuration, only minimal set-up and check-out of the systems is required at the site before operation.

A further advantage of the portable power module 200 is that, as presently configured, it can produce at least approximately one megawatt of electrical power while not generating excessive sound pressure levels. For example, the portable power module 200 of the illustrated embodiment is expected to not exceed a sound pressure level of approximately 74 db(A) at a distance of at least approximately 23 feet from the portable power module during normal operation. This ability to attenuate operational noise is attributable to the positioning of the various outlets (e.g., 233, 243, and 252) on the top portion 209 of the container 202 and other noise reduction features. As a result of the relatively low operating noise, the portable power module 200 is compatible for use in populated areas or other applications with noise restrictions.

A further advantage of the portable power module 200 is provided at least in part by the air provision system 228 that enables the portable power module to produce at least approximately one megawatt of electrical power in a wide range of ambient temperature conditions. For example, it is expected that the portable power module 200 can provide full-rated power at 50 Hz in 93 degree Fahrenheit ambient temperature conditions and at 60 Hz in 107 degree Fahrenheit ambient temperature conditions. In addition to the foregoing benefits, the portable power module 200 can also operate on gaseous fuel, such as natural gas, propane, or methane, rather than liquid fuel, such as diesel fuel. This further benefit means that the portable power module 200 may produce less of the undesirable effluents often associated with liquid fuels.

Figure 3:
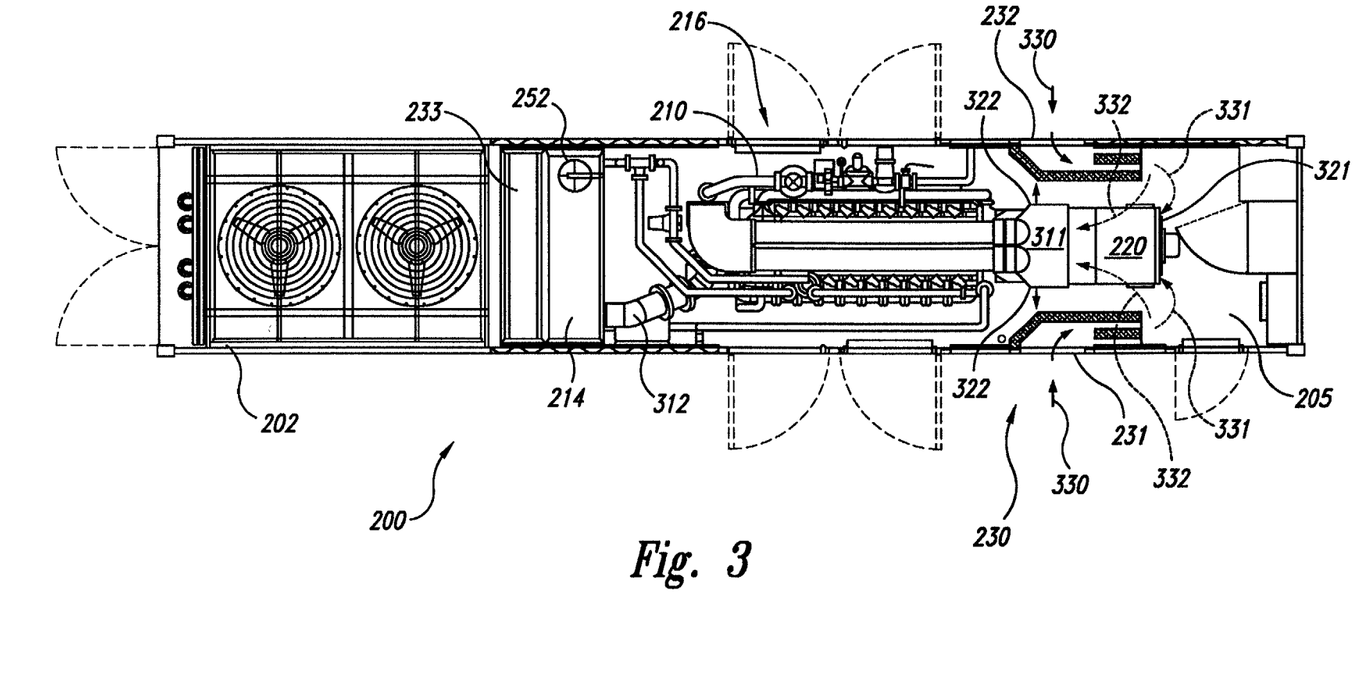
FIG. 3 is a top view of the portable power module of FIG. 2 taken substantially along line 3—3 in FIG. 2 with a roof panel removed for purposes of clarity.
Figure 4:
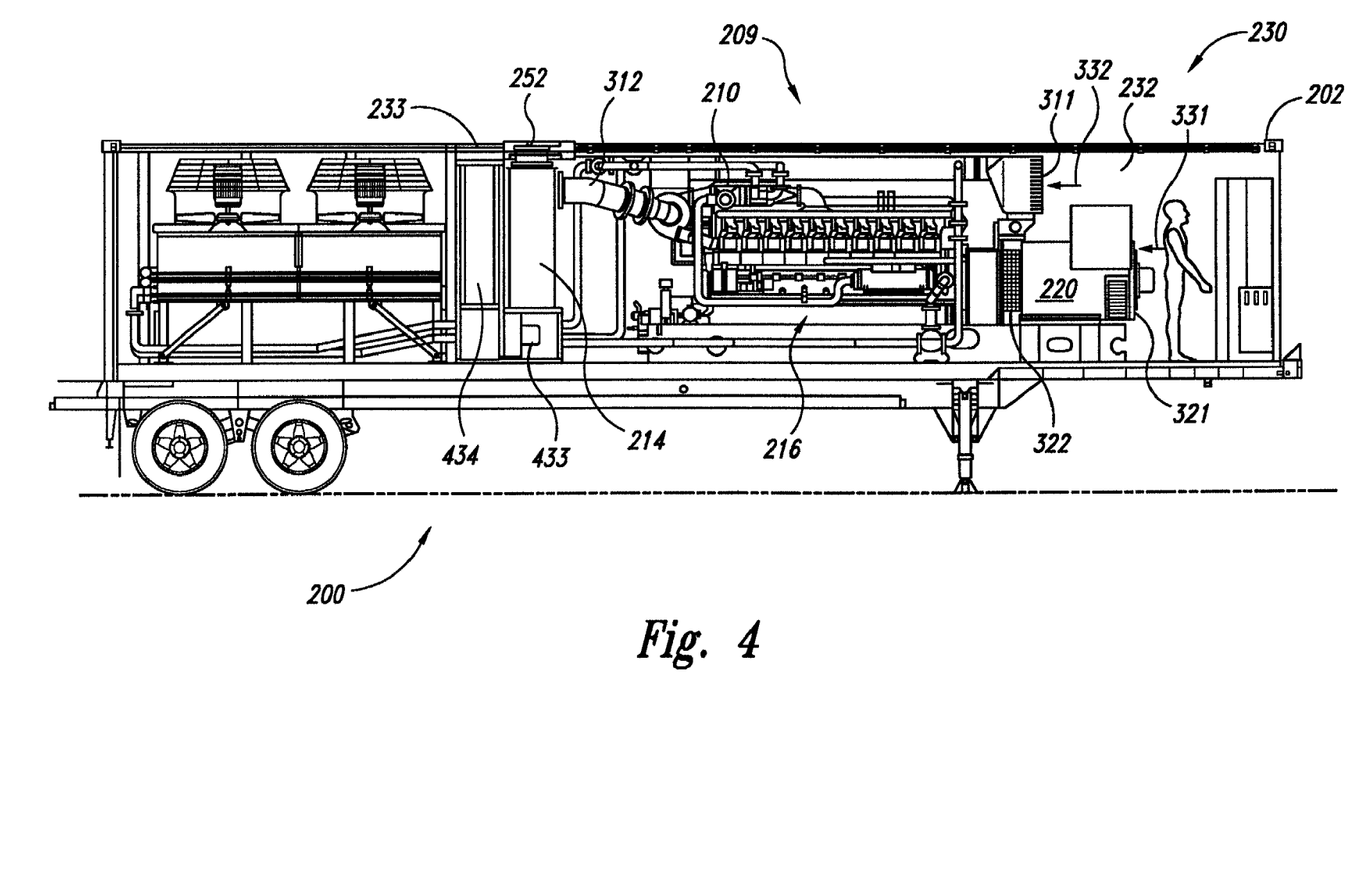
FIG. 4 is a side-elevational view of the portable power module of FIG. 2 taken substantially along line 4—4 in FIG. 2 with a side panel removed for purposes of clarity.

FIG. 3 is a top view of the portable power module 200 taken substantially along line 3—3 in FIG. 2, and FIG. 4 is a side-elevational view of the portable power module taken substantially along line 4—4 in FIG. 2. Portions of the container 202 are shown at least partially removed in FIGS. 3 and 4 for purposes of clarity. Collectively, FIGS. 3 and 4 illustrate various aspects of the first air circuit 230 in accordance with an embodiment of the invention.

As best seen in FIG. 3, a first air portion 330 enters the motor compartment 205 through the first air inlet 231 and the second air inlet 232. A first fraction 331 of the first air portion 330 is drawn into a generator air intake 321 to cool the generator 220. This generator cooling air is exhausted out of a generator air outlet 322, as shown in FIGS. 3 and 4. A second fraction 332 of the first air portion 330 is drawn into a combustion air intake 311 that provides air to the motor 210 for combustion. As shown in FIG. 4, the combustion air intake 311 is positioned upstream of the generator air outlet 322 to ensure fresh, cool air is provided to the motor 210 and not the warm air exhausting from the generator air outlet. After combustion, exhaust gases leaving the exhaust gas manifold 216 of the motor 210 pass through a circular exhaust gas duct 312 into the exhaust gas silencer 214 before being vertically discharged through the exhaust gas outlet 252.

A portion of the air entering the motor compartment 205 through the first and second air inlets 231 and 232 is not drawn into either the generator air intake 321 or the combustion air intake 311. Instead, this portion is used for general ventilation and cooling of the motor compartment 205 and is moved through the motor compartment by a first air moving system 433 (FIG. 4). The first air moving system 433 draws the air from the motor compartment 205 into a rectangular air outlet silencer 434 proximally disposed adjacent to the exhaust gas silencer 214. In one aspect of this embodiment, the first air moving system 433 can be a fan induction system positioned below the exhaust gas silencer 214 just upstream of the air outlet silencer 434. In another aspect of this embodiment, the air outlet silencer 434 is positioned in thermal proximity to the exhaust gas silencer 214 so that air passing through the air outlet silencer passes adjacent to the exhaust gas silencer 214 and convectively reduces the temperature of exhaust gasses passing through the adjacent exhaust gas silencer. Similarly, the proximity of the first air outlet 233 to the exhaust gas outlet 252 promotes mixing of cooling air with exhaust gases to further reduce the exhaust gas temperature exterior of the container 202.

One advantage of the first air circuit 230 of the embodiment shown in FIGS. 3 and 4 is the general compactness provided by the arrangement of the respective components. For example, rather than install an exhaust gas silencer on top of the container 202, the portable power module 200 of the present invention mounts the exhaust gas silencer 214 inside the container. As a result, the exhaust gas silencer configuration of the present invention does not require separate transportation to a job site nor does it require the extensive set-up and check-out procedures often associated with prior art systems. Another advantage of the present invention results from locating the exhaust gas silencer 214 in thermal proximity to the air outlet silencer 434 to enhance the reduction of exhaust gas temperatures.

Figure 5:
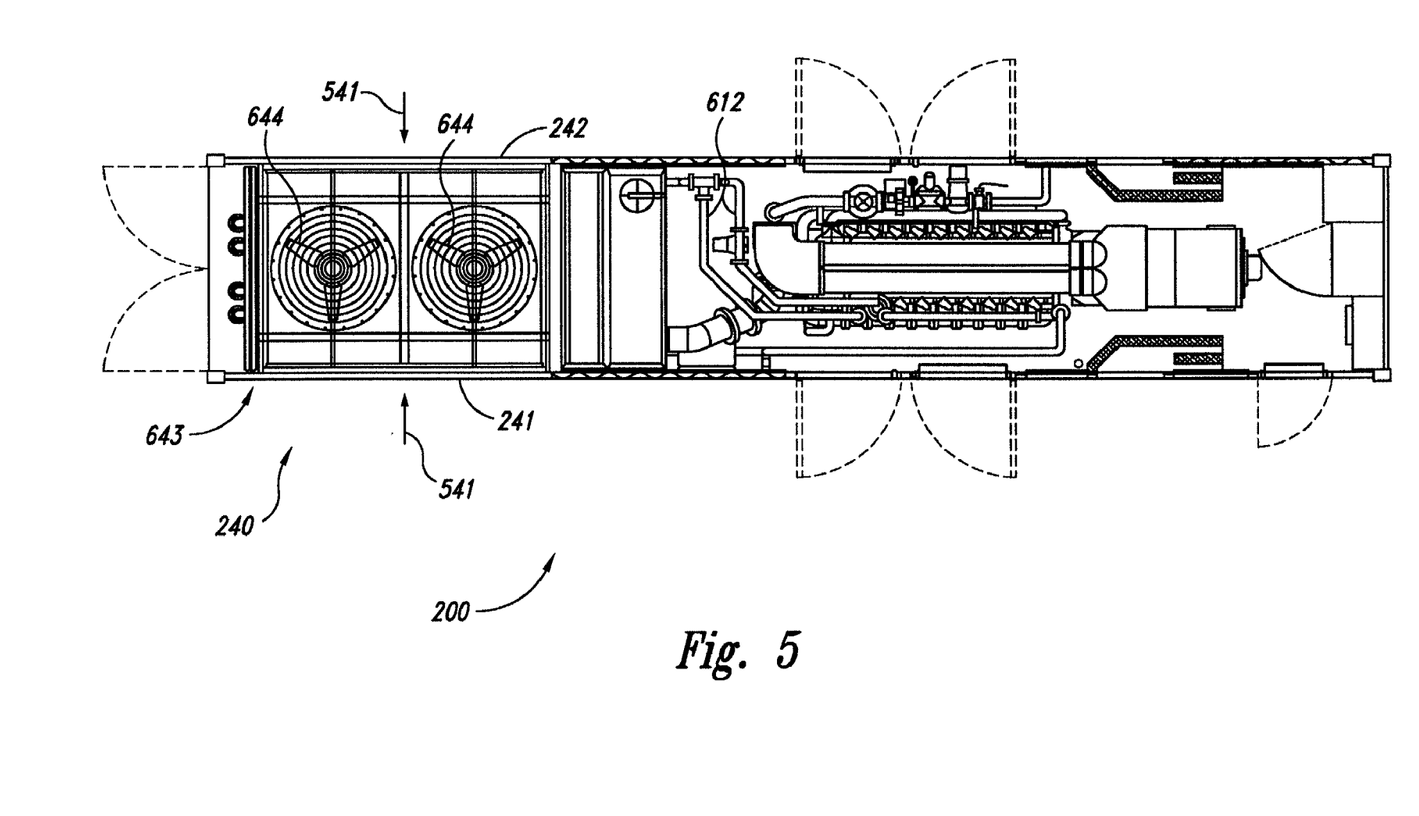
FIG. 5 is a top view of the portable power module of FIG. 2 taken substantially along line 5—5 in FIG. 2 with a roof panel removed for purposes of clarity.
Figure 6:
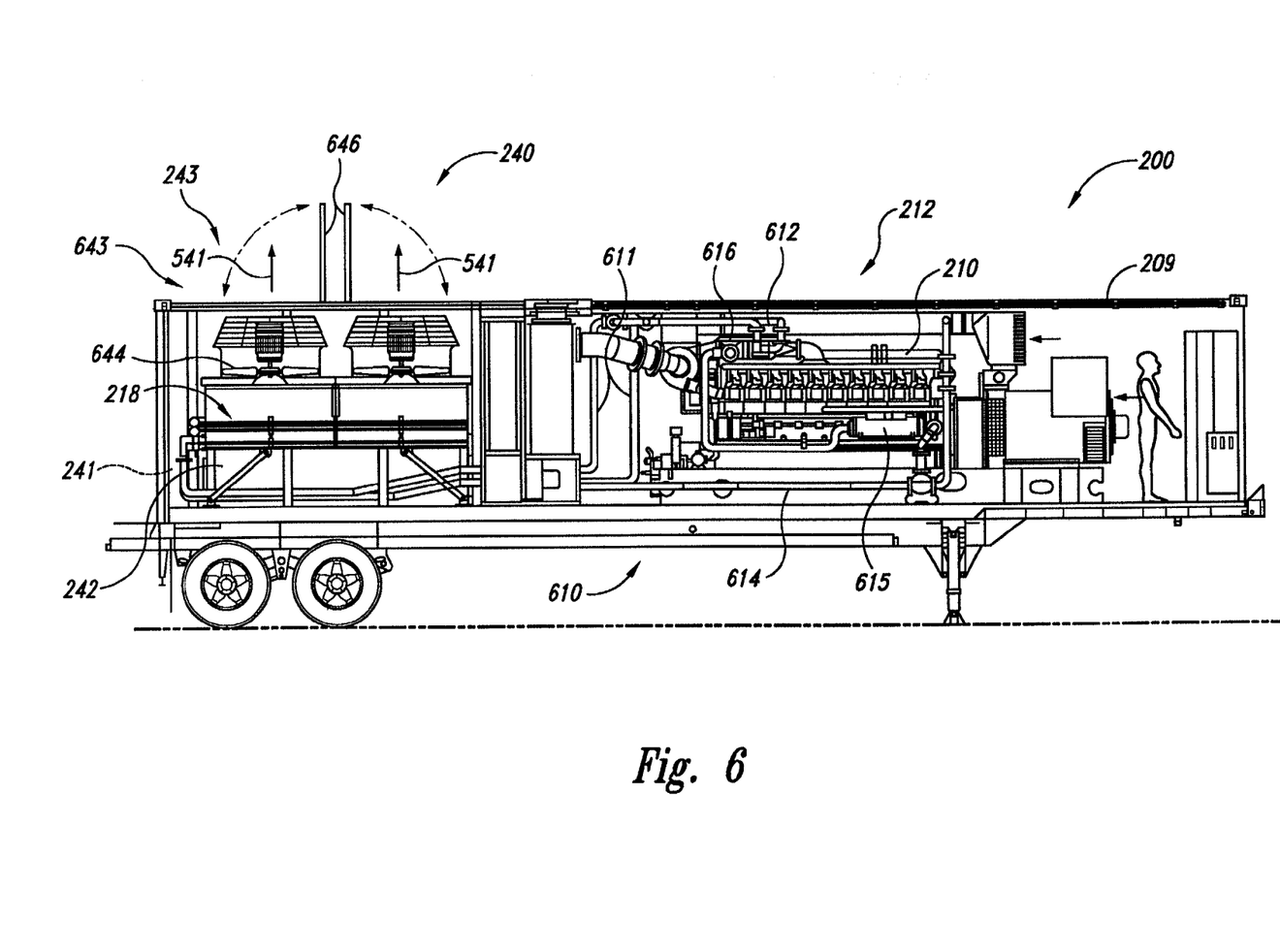
FIG. 6 is a side-elevational view of the portable power module of FIG. 2 taken substantially along line 6—6 in FIG. 2 with a side panel removed for purposes of clarity.

FIG. 5 is a top view of the portable power module 200 taken substantially along line 5—5 in FIG. 2, and FIG. 6 is a side-elevational view of the portable power module taken substantially along line 6—6 in FIG. 2. Portions of the container 202 are omitted from FIGS. 5 and 6 for purposes of clarity. Together FIGS. 5 and 6 illustrate various aspects of the second air circuit 240 in accordance with an embodiment of the invention. FIGS. 5 and 6 are at least substantially similar to FIGS. 3 and 4, respectively, except that different components may be labeled for purposes of discussion.

Referring to FIGS. 5 and 6 together, the second air circuit 240 includes a second air moving system 643 that draws a second air portion 541 horizontally through the third and fourth air inlets 241 and 242. In one embodiment, the second air moving system 643 includes two fans 644 positioned horizontally above the radiator 218. The fans 644 draw the second air portion 541 over the radiator 218 to convectively lower the temperature of coolant circulating through the radiator. After passing over the radiator 218, the second air portion 541 is discharged vertically out the second air outlet 243 (FIG. 6) located on the top portion 209 of the container 202.

As best seen in FIG. 6, the radiator 218 is connected in flow communication with a coolant circuit 610. The coolant circuit 610 includes a low temperature circuit 611 and a high temperature circuit 614. The high temperature circuit 614 circulates coolant through an oil cooler 615, an intercooler first stage 616, and the coolant jacket 212. The low temperature circuit 611 circulates coolant to an intercooler second stage 612.

In one embodiment, the second air circuit 240 includes occluding members 646 that are optionally positionable over the second air outlet 243 when the second air circuit is not in use. In the illustrated embodiment, the occluding members 646 are pivoting cover members that are pivotally attached to the top portion 209 of the container 202 adjacent to the second air outlet 243. The occluding members 646 are optionally rotatable between a substantially horizontal position in which at least a portion of the second air outlet 243 is covered to restrict ingress of rain or other substances and a substantially vertical position in which the second air outlet is substantially open to permit full discharge of the third air portion 541. In one aspect of this embodiment, electrical actuators (not shown) can be interconnected between the occluding members 646 and an adjacent structure, such as the top portion 209 of the container 202, to automatically verticate the occluding members when the motor 210 is started. Similarly, these electrical actuators can be configured to automatically rotate the occluding members 646 back into a closed position when the motor 210 is turned off.

One advantage of the second air circuit 240 as shown in FIGS. 5 and 6 is the general compactness provided by the arrangement of the respective components. For example, rather than install a motor coolant radiator on top of the container 202, the radiator 218 of the present invention is permanently installed inside the container. As a result, the radiator configuration of the present invention does not require separate transportation to a job site, nor does it require the extensive set-up and check-out procedures often associated with prior art systems.

One advantage of the portable power module 200 is the noise reduction resulting from the configuration of the first and second air circuits 230 and 240. As explained under FIGS. 3 and 4, the first air circuit 230 provides air to the motor compartment 205, and the second air circuit 240 provides air to the radiator 218. By using two air circuits instead of one, the individual air demands of each circuit are necessarily less than the total air demand would be for a single circuit that provided air to both the motor compartment 205 and the radiator 218. As a result, the air flow speeds at the first and second air inlets 231 and 232, and the third and fourth air inlets 241 and 242, can be substantially lower than prior art systems that use a single air circuit. This reduction in air speed results in a substantial reduction in air noise at the respective inlets. This reduction in air speed has the further advantage of reducing the amount of rainwater drawn into the container 202 during operation in the rain.

A further advantage of the portable power module 200 is the efficiency of radiator cooling it provides. Power generation systems of the prior art, such as those that use diesel fuel, use a single air circuit for both motor compartment and radiator cooling. As a result, with prior art systems either the radiator or the motor will not receive cool ambient air. For example, if the single air circuit first draws outside air through the motor compartment and then passes it to the radiator, then the radiator would receive preheated air. Conversely, if the air was first drawn over the radiator and then passed to the motor compartment, then the motor would receive preheated air. In contrast, the portable power module 200 of the present invention uses two dedicated air circuits, such that both the motor compartment 205 and the radiator 218 are provided with cool ambient air.

Figure 7A:
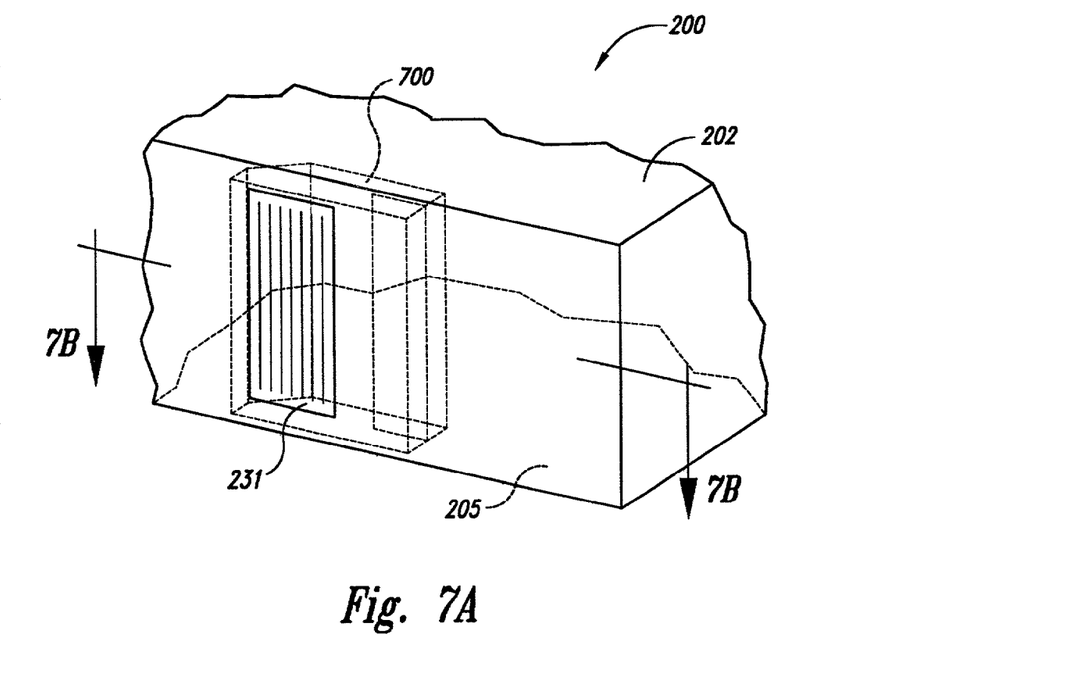
FIG. 7A is an enlarged isometric view of a portion of the portable power module of FIG. 2 illustrating an air duct in accordance with an embodiment of the invention.

FIG. 7A is an enlarged isometric view of the portable power module of FIG. 2 illustrating an air duct 700 in accordance with an embodiment of the invention. In the embodiment shown in FIG. 7A, the air duct 700 is positioned inside the container 202 adjacent to the first air inlet 231 to direct ambient air into the motor compartment 205. In other embodiments, the air duct 700 can be positioned inside or outside the container 202, or adjacent to other air inlets or outlets, as required to suit the particular circumstances. Although only one air duct 700 is discussed here in connection with the first air inlet 231, another air duct that is at least substantially similar can be used in connection with the second air inlet 232.

Figure 7B:
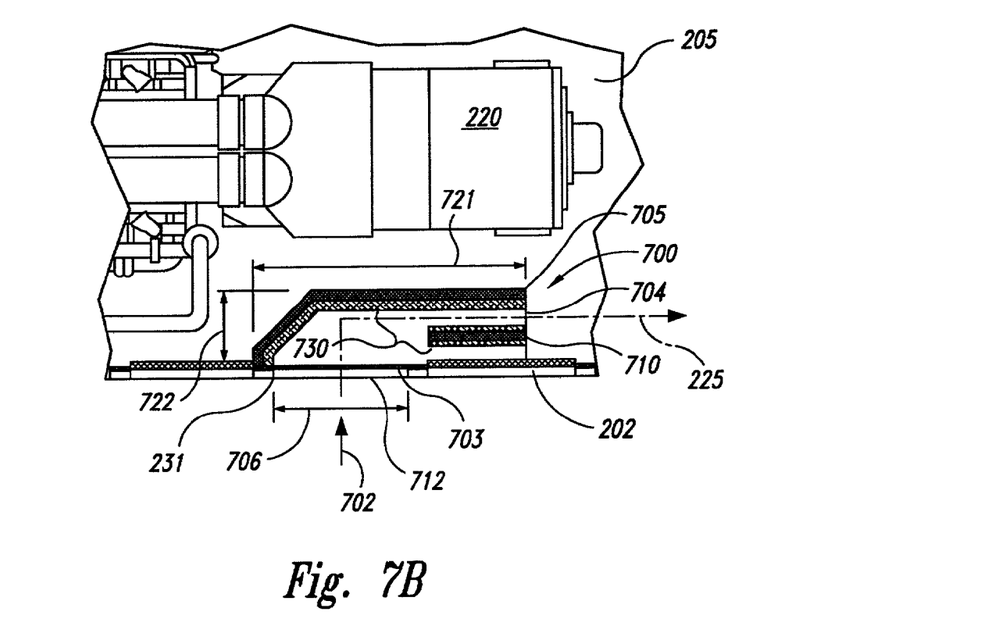
FIG. 7B is a top cross-sectional view of the air duct of FIG. 7A taken substantially along line 7B—7B in FIG. 7A.

FIG. 7B is a top cross-sectional view of the air duct 700 taken along line 7B—7B in FIG. 7A, in accordance with an embodiment of the invention. The air duct 700 includes a body 705 positionable adjacent to the first air inlet 231 to at least partially define a first duct inlet opening 703 and a second duct outlet opening 704. The first opening 703 is parallel to the first direction 225 and the second opening 704 is at an angle to the first direction. In the illustrated embodiment, the second opening 704 is at an angle of 90 degrees to the first direction. Accordingly, in this embodiment, air flowing into the air duct 700 through the first opening 703 undergoes approximately a 90 degree direction change before exiting into the motor compartment 205 through the second opening 704. In other embodiments, the second opening can be at other angles relative to the first direction 225.

The body 705 further defines an overall first body dimension 721 in the first direction 225 and an overall second body dimension 722 in a third direction 702 that is at least substantially perpendicular to the first direction. In a one aspect of this embodiment, the first body dimension 721 is greater than the second body dimension 722. For example, in one embodiment, the first body dimension 721 is between 3–4 feet and the second body dimension is between 1–2 feet. In other embodiments, the first and second body dimensions can have other sizes.

In a further aspect of this embodiment, the first body dimension 721 is greater than a first opening dimension 706, and the second body dimension 722 is less than the first opening dimension. For example, in one embodiment, the first body dimension is between 3–4 feet, the first opening dimension is between 2–3 feet, and the second body dimension is between 1–2 feet. In other embodiments, the first and second body dimensions 721 and 722 can have other sizes relative to each other and relative to the first opening dimension 706.

The air duct 700 can include or be used with various features to enhance flow performance or reduce acoustic noise in accordance with the present invention. For example, a filter member 712, such as a mesh or screen, can be positioned over the first air inlet 231 to prevent the ingress of foreign objects or unwanted substances into the motor compartment 205 through the first opening 703. The air duct 700 can also include an elongate flow splitter 710 longitudinally disposed adjacent to the second opening 704 parallel to the first direction 225 to reduce acoustic noise associated with airflow. Similarly, insulation 730, such as acoustic foam insulation, can be affixed to the flow splitter 710 and to various portions of the body 705, such as the interior of the body, to further reduce acoustic noise.

The air duct 700 can be used as follows in accordance with an embodiment of the invention to provide ambient air to the portable power module 200 (FIG. 2). The first air moving system 433 (FIG. 4) causes ambient air to flow into the air duct 700 through the first opening 703 in the second direction 702. The body 705 of the air duct 700 changes the direction of this ambient air from the second direction 702 to the first direction 225. The flow splitter 710 separates this ambient air into two separate portions before the air flows out of the air duct 700 through the second opening 704 in the first direction 225.

A number of advantages are associated with the air duct 700. For example, the low profile of the air duct 700 relative to the cross section of the container 202 enables an operator (not shown) to move freely about the motor compartment 205 in the vicinity of the air duct with full access to the generator 220. A second advantage of the air duct 700 is the noise attenuation characteristics it provides. The change in direction of the incoming airflow from the third direction 702 to the first direction 225, in conjunction with the insulation 730 and the flow splitter 710, reduces the acoustic noise caused by the airflow. These features contribute to the relatively low overall sound pressure levels generated by the portable power module 200 during normal operation.

From the foregoing, it will be appreciated that specific embodiments of the invention have been described herein for purposes of illustration, but that various modifications may be made without deviating from the spirit and scope of the invention. Accordingly, the invention is not limited except by the appended claims.

I claim:

1. An air duct for use with a portable power module trailerable over public roads, the portable power module including a container having an air inlet and housing a gaseous fuel motor drivably connected to an electrical power generator capable of producing at least approximately one megawatt of electrical power, the air duct comprising:
a duct body positionable adjacent to the air inlet on the container to define, in combination with said container, a first duct inlet opening at said inlet and a second duct outlet opening downstream of said first duct inlet opening, the first duct inlet opening defining a first opening dimension and being parallel to a first direction and the second duct outlet opening being at an angle to the first direction, the duct body further defining a first body dimension in the first direction and a second body dimension in a second direction that is at least substantially perpendicular to the first direction, the first body dimension being greater than the second body dimension.

2. The air duct of claim 1 wherein the second body dimension is less than the first duct inlet opening dimension.

3. The air duct of claim 1 wherein the body is positionable inside the container.

4. The air duct of claim 1 wherein the second duct outlet opening defined by the body of the air duct is perpendicular to the first direction.

5. The air duct of claim 1 wherein the first body dimension is between 3–4 feet and the second body dimension is between 1–2 feet.

6. The air duct of claim 1 further comprising a flow splitter having an elongate cross-section longitudinally disposed parallel to the first direction adjacent to the second duct outlet opening defined by the body of the air duct.

7. The air duct of claim 1 further comprising:
a flow splitter having an elongate cross-section longitudinally disposed parallel to the first direction adjacent to the second duct outlet opening defined by the body of the air duct; and
acoustic insulation fixidly attached to the body.

8. The air duct of claim 1 wherein the body is positionable inside the container, wherein the second duct outlet opening is perpendicular to the first direction, and wherein the air duct further comprises:
a flow splitter having an elongate cross-sectional longitudinally disposed parallel to the first direction adjacent to the second duct outlet opening defined by the body of the air duct; and
acoustic insulation fixidly attached to the interior of the body of the air duct and to the flow splitter.

9. The air duct of claim 1 wherein a portion of ambient air flows into the container through the air duct, and wherein the portion of ambient air enters the air duct through the first duct inlet opening and undergoes an approximate 90 degree change in direction before exiting the air duct into the container through the second duct outlet opening.

10. A portable power module trailerable over public roads and capable of providing electrical power, the portable power module comprising:
a container having an air inlet;
a motor positioned within the container, the motor having a combustion air intake configured to receive combustion air from the air inlet;
an electrical generator positioned within the container and drivably connected to the motor to produce electrical power when driven by the motor at a selected speed, the generator having a generator air intake configured to receive cooling air from the air inlet; and
an air duct having a body positioned adjacent to the air inlet to at least partially define a first duct inlet opening having a first opening dimension and a second duct outlet opening, the first duct inlet opening being parallel to a first direction and the second duct outlet opening being at an angle to the first direction, the body further defining a first body dimension in the first direction and a second body dimension in a second direction that is at least substantially perpendicular to the first direction, the first body dimension being greater than the second body dimension and the second body dimension being less than the first duct opening dimension.

11. The portable power module of claim 10 wherein the air duct is an air inlet duct positioned inside the container.

12. The portable power module of claim 10 wherein the second duct outlet opening defined by the body of the air duct is perpendicular to the first direction.

13. The portable power module of claim 10 wherein the first body dimension defined by the body of the air duct ranges from approximately 3 to 4 feet and the second body dimension defined by the body of the air duct ranges from approximately 1 to 2 feet.

14. The portable power module of claim 10 wherein the air duct further includes a flow splitter having an elongate cross-section longitudinally disposed parallel to the first direction adjacent to the second duct outlet opening defined by the body of the air duct.

15. The portable power module of claim 10 wherein the air duct further includes:
a flow splitter having an elongate cross-sectional longitudinally disposed parallel to the first direction adjacent to the second duct outlet opening defined by the body of the air duct; and
acoustic insulation fixidly attached to the body.

16. The portable power module of claim 10 wherein the air duct is an air inlet duct positioned inside the container, wherein the second duct outlet opening defined by the body of the air duct is perpendicular to the first direction, and wherein the air duct further includes:
a flow splitter having an elongate cross-section longitudinally disposed parallel to the first direction adjacent to the second duct outlet opening defined by the body of the air duct; and
acoustic insulation fixidly attached to the interior of the body of the air duct and to the flow splitter.

17. The portable power module of claim 10 wherein the air inlet is a first air inlet, wherein the container is a shipping container defining a first interior portion toward a third direction and a second interior portion toward a fourth direction opposite to the third direction, wherein the motor is a gaseous fuel motor positioned within the first interior portion, the motor having a coolant jacket for circulating liquid coolant, wherein the electrical generator is positioned within the first interior portion and drivably connected to the motor to produce at least one megawatt of electrical power when driven by the motor at a selected speed, and wherein the portable power module further comprises:
a radiator positioned within the second interior portion in flow communication with the coolant jacket, the radiator configured to receive the coolant from the coolant jacket and return the coolant to the coolant jacket;
a first air circuit including the first air inlet positioned on the container adjacent to the first interior portion to provide an ambient first air portion to the first interior portion at least substantially to the exclusion of the second interior portion, the first air circuit further including a first air outlet positioned on the container to discharge at least a fraction of the first air portion away from the container; and
a second air circuit including a second air inlet positioned on the container adjacent to the second interior portion to provide an ambient second air portion to the second interior portion at least substantially to the exclusion of the first interior portion, the second air circuit further including a second air outlet positioned on the container to discharge at least a fraction of the second air portion away from the container.

18. The portable power module of claim 17 wherein the container further includes a first side portion spaced apart from an opposing second side portion and a bottom portion spaced apart from an opposing top portion, the bottom and top portions being connected to the first and second side portions, wherein:
the first air inlet is positioned to one of the first or second side portions;
the second air inlet is positioned adjacent to one of the first or second side portions;
the first air outlet is positioned adjacent to the top portion of the container to vertically discharge at least a fraction of the first air portion away from the container; and
the second air outlet is positioned adjacent to the top portion of the container to vertically discharge at least a fraction of the second air portion away from the container.

19. The portable power module of claim 17 wherein the first air portion provides ambient air to the combustion air intake and the generator air intake, and wherein the second air portion provides ambient air to the radiator adjacent to cool the coolant received from the coolant jacket.

20. The portable power module of claim 17 wherein the container further includes a first side portion spaced apart from an opposing second side portion and a bottom portion spaced apart from an opposing top portion, the bottom and top portions being connected to the first and second side portions, wherein the portable power module further comprises an exhaust gas silencer positioned within the container and having an exhaust gas outlet positioned adjacent to the top portion of the container, the exhaust gas silencer connected in flow communication with the combustion chamber and configured to receive exhaust gases from the combustion chamber and vertically discharge the exhaust gases through the exhaust gas outlet away from the container.

21. The portable power module of claim 17 further comprising:
a first air moving system, the first air moving system including a first fan positioned in flow communication with the first air outlet to move at least a fraction of the first air portion from the first interior portion through the first air outlet and away from the container; and
a second air moving system, the second air moving system including a second fan in flow communication with the second air outlet to move at least a fraction of the second air portion from the second interior portion, past the radiator, through the second air outlet and away from the container.

22. The portable power module of claim 17 wherein the container further includes a first side portion spaced apart from an opposing second side portion and a bottom portion spaced apart from an opposing top portion, the bottom and top portions being connected to the first and second side portions, wherein the first air outlet is positioned adjacent to the top portion of the container to vertically discharge at least a fraction of the first air portion away from the container, wherein the second air outlet is positioned adjacent to the top portion of the container to vertically discharge at least a fraction of the second air portion away from the container, and wherein the portable power module further comprises:
a first air moving system, the first air moving system including a first fan positioned in flow communication with the first air outlet to move at least a fraction of the first air portion from the first interior portion through the first air outlet and away from the container; and
a second air moving system, the second air moving system including a horizontally situated second fan in flow communication with the second air outlet to move at least a fraction of the second air portion from the second interior portion, past the radiator, through the second air outlet and away from the container.

23. The portable power module of claim 17 wherein the container has an overall length dimension of about 40 feet or less, an overall width dimension of about 8 feet or less, and an overall height dimension of about 8.5 feet or less.

24. The portable power module of claim 17 wherein the combustion chamber is configured to combust a fuel mixture comprising natural gas.

25. The portable power module of claim 17 wherein the generator produces at least approximately one megawatt of electrical power ranging from approximately 50 Hz to 60 Hz when driven by the motor at a speed ranging from 1500 to 1800 RPM.

26. The portable power module of claim 17 further comprising a trailer supporting the container and its contents, the trailer having a tandem axle rear wheel-set and a forward coupling, the coupling being releasably attachable to a transport vehicle for movement of the portable power module over public roads.

27. A method for providing ambient air to a portable power module trailerable over public roads, the portable power module including a container having an air inlet and housing a motor drivably connected to an electrical generator for producing electrical power, the method comprising:
providing an air duct having a body defining a first body dimension in a first direction and a second body dimension in a second direction that is at least substantially perpendicular to the first direction, the first body dimension being greater than the second body dimension;
positioning the air duct adjacent to the air inlet to at least partially define a first duct inlet opening and a second duct outlet opening, the first duct inlet opening being parallel to a first direction and the second duct outlet opening being at an angle to the first direction, the first duct inlet opening defining an opening dimension that is less than the first body dimension;
flowing ambient air into the air duct through the first duct inlet opening;
changing the direction of the ambient air from the second direction to the first direction; and
flowing the ambient air into the air duct through the second duct outlet opening.

28. The method of claim 27 wherein:
flowing the ambient air into the air duct includes flowing the ambient air into the air duct through the first duct inlet opening in the second direction; and
flowing the ambient air out of the air duct includes flowing the ambient air out of the air duct through the second duct outlet opening in the first direction.

29. The method of claim 27 wherein positioning the air duct adjacent to the air inlet includes positioning the air duct to at least partially define the second duct outlet opening at a right angle to the first direction.

30. The method of claim 27 wherein positioning the air duct adjacent to the air inlet includes positioning the air duct inside the container.

31. The method of claim 27 further comprising:
affixing a flow splitter to the body of the air duct, the flow splitter having an elongate cross-section longitudinally disposed parallel to the first direction adjacent to the second duct outlet opening; and
separating the ambient air into a first portion and a separate second portion, wherein flowing the ambient air out of the air duct includes flowing the first and second portions out of the air duct through the second duct outlet opening.

32. The method of claim 27 further comprising:
affixing acoustic insulation to an interior portion fo the body of the air duct;
affixing a flow splitter to the body of the air duct, the flow splitter having an elongate cross-section longitudinally disposed parallel to the first direction adjacent to the second duct outlet opening; and
separating the ambient air into a first portion and a separate second portion, wherein flowing the ambient air out of the air duct includes flowing the first and second portions out of the air duct through the second duct outlet opening.

33. The method of claim 27 wherein changing the direction of the ambient air from the second direction to the first direction includes changing the direction of the ambient air by approximately 90 degrees.

* * * * *